US012780606B2

(12) United States Patent
Bhaskar

(10) Patent No.: US 12,780,606 B2
(45) Date of Patent: Nov. 3, 2026

(54) WALL CLIMBING ELEVATOR SYSTEMS

(71) Applicant: Otis Elevator Company, Farmington, CT (US)

(72) Inventor: Kiron Bhaskar, Deep River, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 19/169,107

(22) Filed: Apr. 3, 2025

(65) Prior Publication Data

US 2026/0307944 A1 Oct. 8, 2026

(51) Int. Cl.
*B66B 9/16* (2006.01)
*B62D 57/024* (2006.01)

(52) U.S. Cl.
CPC .............. *B66B 9/16* (2013.01); *B62D 57/024* (2013.01)

(58) Field of Classification Search
CPC ........... B66B 9/16; B66B 9/20; B66B 11/005; B62D 57/024
See application file for complete search history.

(56) References Cited

U.S. PATENT DOCUMENTS 4,809,383 A * 3/1989 Urakami ................... B08B 1/32 15/385
6,913,524 B2 * 7/2005 Urakami ................ B62D 57/02 269/21
11,390,490 B2 7/2022 Bhaskar
11,407,617 B2 8/2022 Bhaskar
11,434,107 B2 9/2022 Hollowell et al.
2013/0037050 A1 * 2/2013 Chao .................... G05D 1/0212 15/103
2016/0347383 A1 * 12/2016 Li ........................ B62D 57/024
2019/0337581 A1 * 11/2019 Matsuyama ......... B62D 57/024
2021/0221647 A1 * 7/2021 Wong ........................ B66B 1/32
2022/0135375 A1 5/2022 Bhaskar

FOREIGN PATENT DOCUMENTS

EP 3453664 A1 3/2019
EP 3854742 B1 1/2025
KR 20220000308 A * 1/2022 ............. B63B 73/60

OTHER PUBLICATIONS

Yoneda, Yuka, "Itself—As Your Apartment Balcony", InHabitat, , available at: https://inhabitat.com/the-metromorph-concept-car-parks-itself-as-your-apartment-balcony/, dated Aug. 20, 2011, 2 pages.

* cited by examiner

*Primary Examiner* — Minh Truong
(74) *Attorney, Agent, or Firm* — CANTOR COLBURN LLP

(57) ABSTRACT

Wall climbing elevator systems include a load compartment and a carriage assembly. The carriage assembly includes a set of wheels configured to frictionally engage with a wall surface of a building and at least one suction system configured to aerodynamically adhere the carriage assembly and the load compartment to the wall surface. Each suction system of the at least one suction system includes a skirt assembly defining a suction chamber between the carriage assembly and the wall surface and a fan assembly for generating a low pressure within the suction chamber to generate an aerodynamic adhesion to secure the carriage assembly and the load compartment to the wall surface.

20 Claims, 6 Drawing Sheets

WALL CLIMBING ELEVATOR SYSTEMS

BACKGROUND

The subject matter disclosed herein generally relates to elevator systems and, more particularly, to wall climbing elevator systems.

Elevator systems may be used to carry loads between landings of a building. Typical elevator systems utilize an elevator car suspended in a hoistway via one or more load bearing members, such as ropes or belts. The load bearing members are driven via a traction arrangement with a drive machine and drive sheave fixed in the hoistway, thus moving the elevator car along the hoistway.

Such arrangements limit the number of cars that may operate in the same hoistway. Typical elevator systems require many additional components separate from the elevator car. Further, as lifting height increases, the weight of the required load bearing member increases as well, typically resulting in an increased sizing of the drive machine to lift not only the elevator car, but also the associated load bearing member.

SUMMARY

According to some embodiments, wall climbing elevator systems are provided. The wall climbing elevator systems include a load compartment and a carriage assembly. The carriage assembly includes a set of wheels configured to frictionally engage with a wall surface of a building and at least one suction system configured to aerodynamically adhere the carriage assembly and the load compartment to the wall surface. Each suction system of the at least one suction system includes a skirt assembly defining a suction chamber between the carriage assembly and the wall surface and a fan assembly for generating a low pressure within the suction chamber to generate an aerodynamic adhesion to secure the carriage assembly and the load compartment to the wall surface.

In addition to one or more of the features described above, or as an alternative, further embodiments of the wall climbing elevator systems may include that the skirt assembly further comprises a seal element configured to sealingly engage with the wall surface.

In addition to one or more of the features described above, or as an alternative, further embodiments of the wall climbing elevator systems may include that the seal element is normally biased into sealing engagement with the wall surface.

In addition to one or more of the features described above, or as an alternative, further embodiments of the wall climbing elevator systems may include that the seal element is configured to lift from sealing engagement with the wall surface during operation of the fan assembly, to cause a flow of air from ambient and into the suction chamber to maintain a minimum aerodynamic suction pressure.

In addition to one or more of the features described above, or as an alternative, further embodiments of the wall climbing elevator systems may include that the set of wheels are each self-powered wheels, comprising a respective prime mover for driving rotation of the respective wheel.

In addition to one or more of the features described above, or as an alternative, further embodiments of the wall climbing elevator systems may include that the carriage assembly comprises a sled and the load compartment is mounted to the sled.

In addition to one or more of the features described above, or as an alternative, further embodiments of the wall climbing elevator systems may include one or more elevator mounts configured to securely attach the load compartment to the sled.

In addition to one or more of the features described above, or as an alternative, further embodiments of the wall climbing elevator systems may include that the one or more elevator mounts each comprise at least one of biasing elements and damping elements.

In addition to one or more of the features described above, or as an alternative, further embodiments of the wall climbing elevator systems may include that the fan assembly comprises at least two vacuum pumps fluidly coupled to the suction chamber.

In addition to one or more of the features described above, or as an alternative, further embodiments of the wall climbing elevator systems may include that the skirt assembly comprises a flow guide extending inward from the skirt assembly and into the suction chamber, the flow guide configured to control flow of ambient air exiting the suction chamber.

In addition to one or more of the features described above, or as an alternative, further embodiments of the wall climbing elevator systems may include that the skirt assembly comprises a rigid frame, a biasing element and a seal element.

In addition to one or more of the features described above, or as an alternative, further embodiments of the wall climbing elevator systems may include that the biasing element is configured to bias the seal element into engagement with the wall surface.

In addition to one or more of the features described above, or as an alternative, further embodiments of the wall climbing elevator systems may include that the skirt assembly further comprises a flow guide extending inward from the rigid frame and into the suction chamber, the flow guide configured to control flow of ambient air exiting the suction chamber.

In addition to one or more of the features described above, or as an alternative, further embodiments of the wall climbing elevator systems may include that the seal element comprises an encapsulated O-ring with a coating applied to an exterior of the O-ring.

In addition to one or more of the features described above, or as an alternative, further embodiments of the wall climbing elevator systems may include that the carriage assembly is an integral part of the load compartment.

In addition to one or more of the features described above, or as an alternative, further embodiments of the wall climbing elevator systems may include that the load compartment is a passenger compartment of an elevator car.

In addition to one or more of the features described above, or as an alternative, further embodiments of the wall climbing elevator systems may include an airfoil mounted to the load compartment and configured to generate drag during motion of the load compartment along the wall surface.

In addition to one or more of the features described above, or as an alternative, further embodiments of the wall climbing elevator systems may include a venting system fluidly coupled to the suction system and to direct exhaust air from the suction chamber to ambient.

In addition to one or more of the features described above, or as an alternative, further embodiments of the wall climbing elevator systems may include a nozzle at an end of the venting system, the nozzle arranged to generate a thrust force that acts to urge the load compartment toward the wall surface.

In addition to one or more of the features described above, or as an alternative, further embodiments of the wall climbing elevator systems may include that the wheels are configured to travel along tracks formed on the wall surface.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the Figures.

Figure 1:
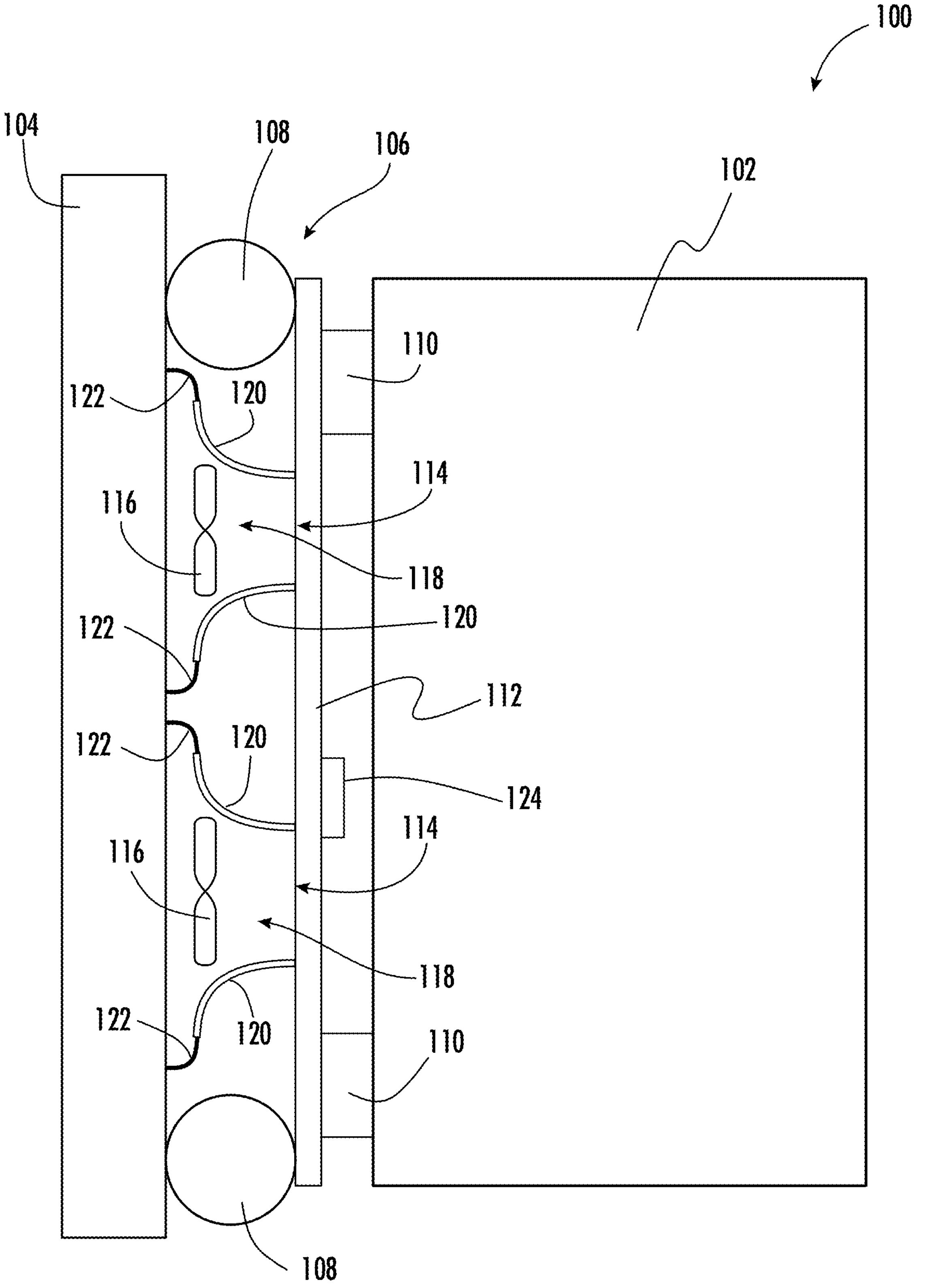
FIG. 1 is a schematic illustration of a wall climbing elevator system in accordance with an embodiment of the present disclosure.

Referring to FIG. 1, a schematic illustration of a wall climbing elevator system 100 in accordance with an embodiment of the present disclosure is shown. The wall climbing elevator system 100 includes a load compartment 102, such as an elevator cab, elevator car, basket, or other load carrying structure or frame. The elevator system is configured to move along a wall 104 via a carriage assembly 106. The carriage assembly 106, in accordance with embodiments of the present disclosure, is configured to utilize aerodynamic adhesion for connecting or attaching the load compartment 102 to the wall 104. The aerodynamic adhesion, which may be achieved via a vacuum system as described herein, provides a suspension function to suspend the load compartment 102 and to provide necessary normal forces and sufficient traction to suspend the wall climbing elevator system 100. The normal forces, such as at wheels 108 of the carriage assembly 106, will generate friction forces that supports the load compartment 102 and enables travel along the wall 104.

The load compartment 102 is supported on the carriage assembly 106 by one or more elevator mounts 110. The elevator mounts 110 may be configured to securely attach the load compartment 102 to a sled 112 of the carriage assembly 106. In some configurations, the elevator mounts 110 may include springs, biasing elements, damping elements, or the like, to provide shock absorption and improved travel smoothness of the load compartment 102 along the wall 104.

In this configuration, the sled 112 of the carriage assembly 106 supports the load compartment 102 on one side, and the wheels 108 on the opposite side. Each of the wheels 108 may be a propelled wheel, having an internal motor or the like. The carriage assembly 106 includes mechanisms for generating aerodynamic adhesion between the carriage assembly 106 and the wall 104. In this illustrative configuration, the aerodynamic adhesion is generated by means of one or more suction systems 114. In the side illustrative depiction of FIG. 1, there are two suction systems 114 shown. However, it will be appreciated that any number of suction systems may be employed, depending on the specific configurations thereof (e.g., size, location, supported weight, etc.). Each suction system 114 includes a fan assembly 116, such as a suctions pump, vacuum pump, blower, or the like, which is arranged within or otherwise fluidly coupled to a suction chamber 118. Each suction chamber 118 is defined between the sled 112, the wall 104, and a skirt assembly 120 which may include a seal element 122 at the contact point or area between the skirt assembly 120 and the wall 104.

The suction systems 114 and operation of the wheels 108 may be controlled by a controller 124. The controller 124, in this configuration, is mounted on the sled 112. However, it will be appreciated that the controller may be located on the load compartment 102 or otherwise arranged in communication with the suction systems 114 and the wheels 108. In some embodiments, the controller 124 may be part of an elevator controller that is integrated into the load compartment 102. If the controller 124, that is configured to control operation of the suction systems 114 and the wheels 108, is arranged on or as part of the sled 112, such controller 124 may be arranged in communication with an elevator controller that is configured to receive input from a passenger (e.g., destination inputs). The controller 124 may include one or more batteries, power supplies, or the like, for supplying power to the various components of the wall climbing elevator system 100. For example, the power supply may be used to power the controller 124, the wheels 108, the suction systems 114, elevator car doors, and other electronic or electrical systems of the wall climbing elevator system 100. It will be appreciated that other types of power supply may be employed without departing from the scope of the present disclosure, including power rails, cables, power generators, or the like.

To maintain the connection between the load compartment 102 and the wall 104, the sled assembly 106 is configured to generate aerodynamic adhesion. Accordingly, the suction systems 114 may be operated to generate a continuous air flow while maintaining a minimum suction pressure. The continuous air flow may be driven by the fan assemblies 116 during travel of the load compartment 102 along the wall 104. The skirt assemblies 120, with optional seal elements 122, are provided to ensure that a seal is formed around the engagement between the suction systems 114 and the wall 104. For example, a low pressure may be generated within the suction chamber 118 to generate sufficient pressure differential to create a normal force to adhere the sled assembly 106 to the wall 104, thereby supporting the load compartment 102 on the wall 104.

Figure 2A:
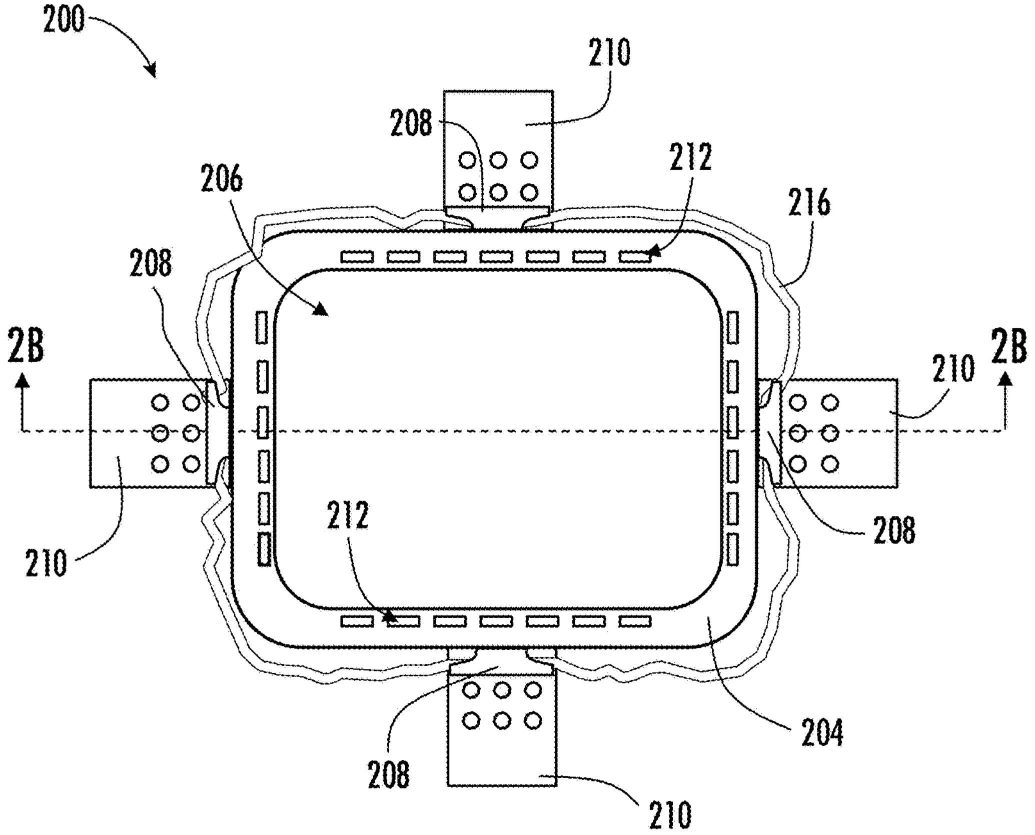
FIG. 2A is a plan view illustration of a suction system for use with a wall climbing elevator system in accordance with an embodiment of the present disclosure.
Figure 2B:
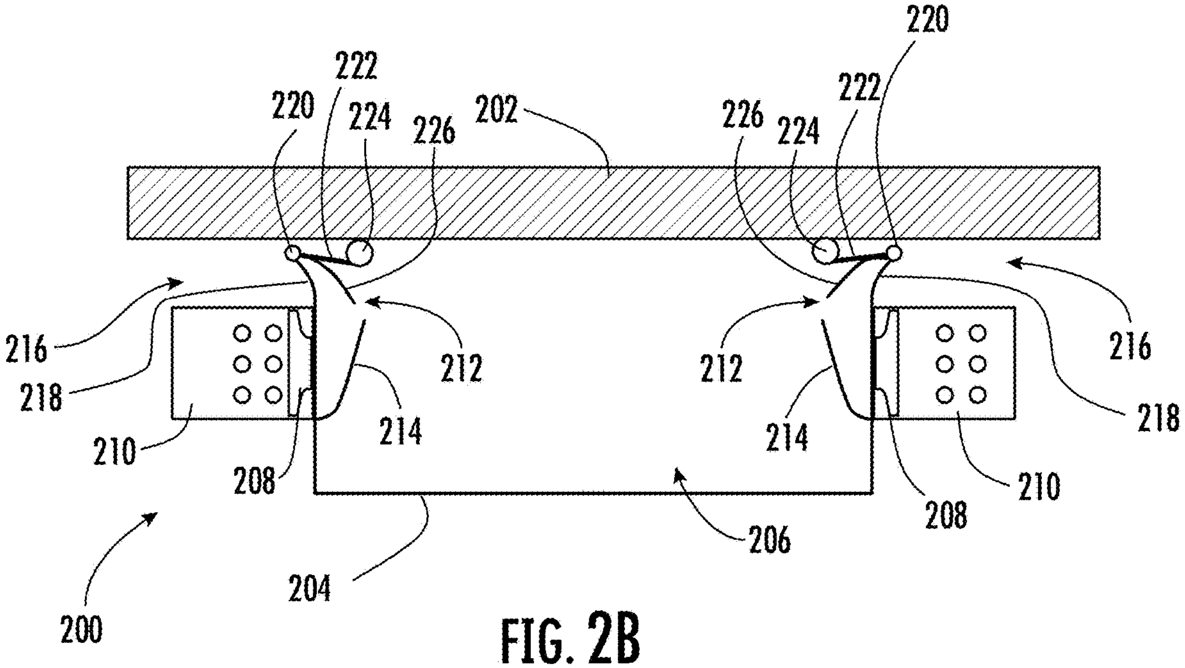
FIG. 2B is a cross-sectional view of the suction system of FIG. 2A as viewed along the line 2B-2B shown in FIG. 2A.

Referring now to FIGS. 2A-2B, schematic illustrations of a suction system 200 in accordance with an embodiment of the present disclosure are shown. The suction system 200 may be part of a carriage assembly and/or elevator system in accordance with embodiments of the present disclosure. The suction system 200 is configured to be operated to generate a low pressure or vacuum pressure between a carriage or elevator car and a wall along which the carriage/elevator car will travel. FIG. 2A illustrates a plan view of the suction system 200 and FIG. 2B illustrates a cross-sectional view of the suction system 200 relative to a wall 202, as viewed along the line 2B-2B shown in FIG. 2A.

The suction system 200 includes a housing 204 that defines a suction chamber 206 between the housing 204 and the wall 202. The housing 204 may be attached to or part of a carriage and/or an elevator car, as will be appreciated by those of skill in the art. Arranged about the housing 204 are a set of fan assemblies 208, such as vacuum pumps, suction pumps, blowers, fans, or the like. The fan assemblies 208 are arranged to pull air from the suction chamber 206 and expel it to ambient, thus creating a low pressure within the suction chamber 206, which generates aerodynamic adhesion. That is, the suction system 200 is secured to the wall 202 by low or vacuum pressure within the suction chamber 206. In the illustrative configuration of FIGS. 2A-2B, the fan assemblies 208 are arranged about an exterior or edge of the housing 204. This is in contrast to the configuration shown in FIG. 1, where the fan assemblies 116 are arranged within the center of the suction chamber 118. It will be appreciated that other arrangements of the fan assemblies may be employed without departing from the scope of the present disclosure.

Each fan assembly 208 is arranged fluidly between the suction chamber 206 defined by the housing 204 and a respective outlet vent 210. The inlet side of the fan assemblies 208 may be directly coupled to the suction chamber 206, or may, as illustratively shown in FIG. 2A, be fluidly coupled to the suction chamber 206 via one or more suction holes 212. The suction holes 212 may be arranged to aid in the airflow through the suction chamber 206 and through the fan assemblies 208. The suction holes 212 may be defined, in part, by a housing extension 214 (see FIG. 2B) that extends into the interior of the suction chamber 206 from the housing 204.

The housing 204 substantially sealingly engages with the wall 202 by means of a skirt assembly 216. The skirt assembly 216 may take a variety of different formats or configurations. For example, a flexible skirt-like material may be used, similar to a hovercraft or the like, with a rubber or synthetic flexible material that can provide a substantially consistent engagement with the wall 202 due to a pressure differential. However, more complex skirt assemblies may be employed without departing from the scope of the present disclosure.

FIG. 2B illustrates details of the skirt assembly 216. As shown, the skirt assembly 216 of this non-limiting embodiment includes a skirt extension 218 that extends from the housing 204. At an end of the skirt extension 218 is a rigid frame 220, such as a hoop, ring, or other structure that has substantially the same shape or geometry as the housing 204. Extending inward into the suction chamber 206 from the rigid frame 220 is a biasing element 222. At an end of the biasing element 222 opposite the rigid frame 220 is a seal element 224. The biasing element 222 may be a spring or spring-like structure, such as a diaphragm or the like, which is normally biased away from the housing 204 and toward the wall 202. As such, in an off state, a fluid seal is generated by urging the seal element 224 into contact with the wall 202 to thereby prevent fluid flow into or out of the suction chamber 206 around the seal element 224. The seal element 224, in some embodiments, may be an encapsulated O-ring. In some such embodiments, a polytetrafluoroethylene (PTFE) or other material may be used to coat or encapsulate the O-ring or other structure. Also extending inward into the suction chamber 206 is an optional flow guide 226, such as a blade or airfoil type structure that guides flow as it flows from the suction chamber 206 into and through the fan assemblies 208. Such a flow guide 226 may improve the suction and flow of air during operation of the suction system 200. The flow guides 226, as shown, may extend from the rigid frame 220. In other embodiments, the flow guides 226 may extend from the housing 204 or may be arranged as similar and complimentary structures to housing extension 214. Accordingly, a guided flow that is encouraged by airfoil-like structure may be provided in some embodiments.

In operation, the suction system 200 is configured to maintain a minimum required suction to maintain sufficient suction force to secure the weight of an elevator car (and associated loads) to the wall 202. To ensure this, the biasing element 222 is selected to apply a normal force toward the wall 202 to ensure contact between the seal element 224 and the wall 202. At the same time, the fan assemblies 208 are arranged to provide one-way or one-directional flow (i.e., outward from the suction cavity 206). As such, the suction cavity 206 may be maintained as fluidly isolated from ambient, in the off state of the suction system 200, thereby maintaining a suction force to secure the suction system 200 and the associated elevator system to the wall 202. When motion is desired, the suction system 200 is operated, and the fan assemblies 208 are operated to expel air from the suction chamber 206.

Until the minimum suction pressure ($p_{suction}$) is reached, the seal element 224 will be in a closed or sealed position due to the spring force of the biasing element 222. Once the minimum pressure ($p_{suction}$) is reached, the differential pressure across the seal element 224 will become large enough to lift the seal element 224 away from engagement with the wall 202 and enable air flow from ambient ($p_{ambient}$) to flow past the seal element 224 into the suction cavity 206 while maintaining the minimum pressure ($p_{suction}$) within the suction cavity. With a continuous airflow passing between the wall 202 and the seal element 224, the elevator system will be able to travel along the wall 202 without the seal element 224 substantially interfering with such travel. As noted, in some embodiments an O-ring of the seal element 224 may be coated or encapsulated, to reduce sliding friction between the seal element 224 and the wall 202. In the event of a change in differential pressure between the suction cavity 206 and ambient, the biasing element 222 will urge the seal element 224 into sealing engagement with the wall 202 to thereby prevent loss of the suction engagement between the suction system 200 and the wall 202.

The elevator systems described herein are configured to be attached to a wall or other surface of a building, and capable of travel along the surface. The suction systems described above, such as suction system 200 shown in FIGS.

2A-2B, may be used to adhere the elevator car or related components to the surface. However, such suction does not provide a motive force to move the system along the surface. Rather, the system is configured with one or more wheels, such as wheels 102 shown in FIG. 1. The wheels of embodiments of the present disclosure may be rotationally driven to cause motion of the elevator system along the surface/wall.

Figure 3:
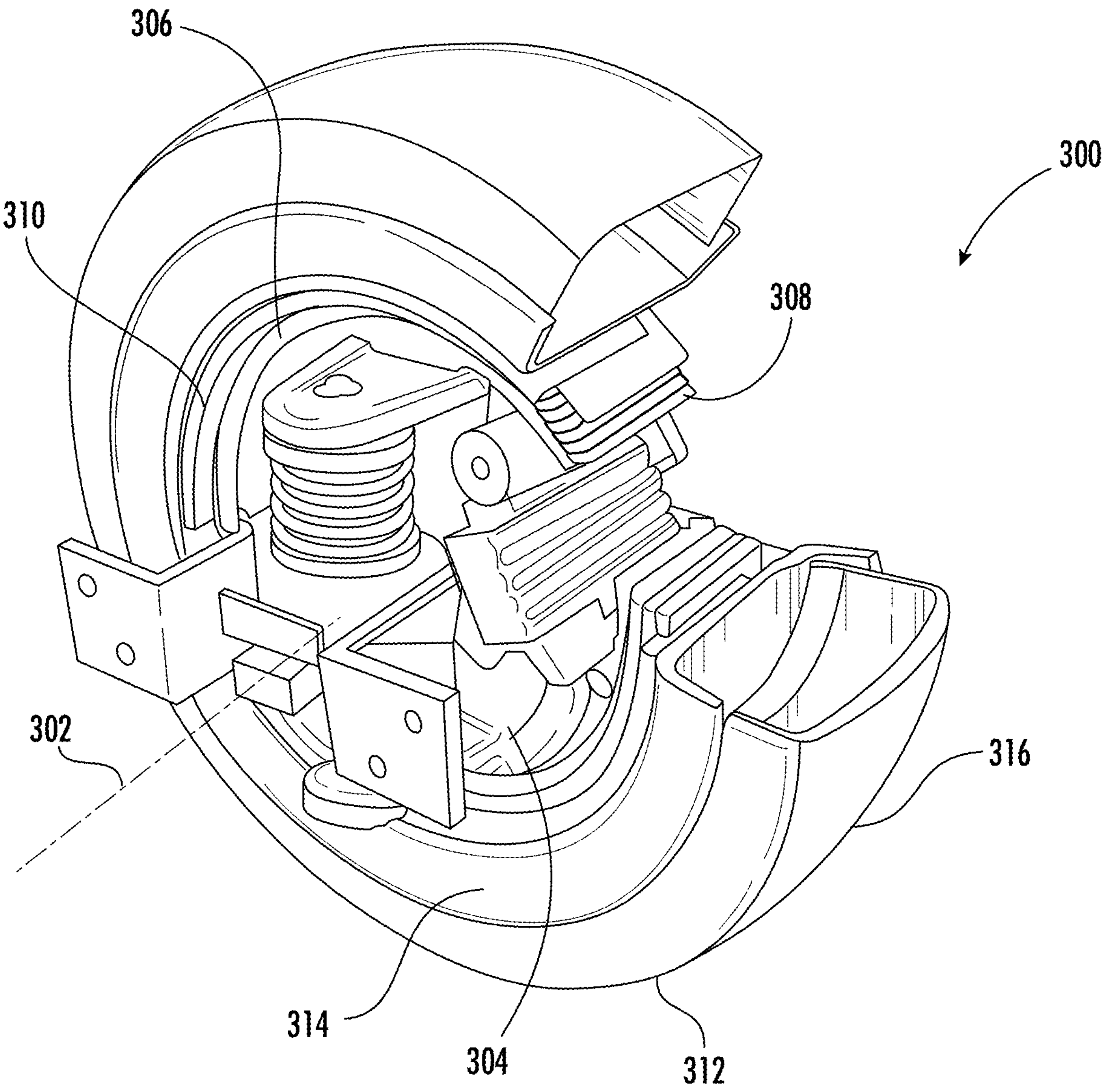
FIG. 3 is a schematic illustration of a wheel for use with a wall climbing elevator system in accordance with an embodiment of the present disclosure.

Referring now to FIG. 3, a schematic illustration of a wheel 300 in accordance with an embodiment of the present disclosure is shown. The wheel 300 may be fixedly connected to a carriage or the like or otherwise coupled to an elevator car that is arranged in accordance with the present disclosure. The wheel 300 may be a self-powered wheel, with all components necessary to drive rotation of the wheel 300 incorporated into the structure of the wheel 300. The wheel may be configured to receive commands from a controller of the elevator car or elevator system, and systems with multiple wheels may be operated simultaneously to ensure proper motion of the elevator system along the surface of the building.

The wheels 300 are driven about a respective wheel axis 302 by a prime mover 304, which may be a motor or drive mechanism that is housed within the wheel 300. In other embodiments, a mechanical, electromechanical, or other connection between the wheel and a remote drive mechanism may be employed without departing from the scope of the present disclosure. For example, in some embodiments, multiple wheels of an elevator system may be collectively driven by a single prime mover that is mounted to a carriage assembly or other structure of an elevator car in accordance with embodiments of the present disclosure. However, as shown in FIG. 3, the wheel 300 is individually driven by a dedicated or integrated prime mover 304. In some embodiments, the prime mover 304 is a direct drive prime mover, such as a wheel hub motor. In some embodiments, each wheel 300 of an elevator system may be driven by the respective prime mover 304 in a torque range of 4000 Nm to 7200 Nm, and at a rotational speed about the wheel axis 302 of less than 1000 RPM.

The wheels 300 may include various additional components and features, without departing from the present disclosure. For example, each wheel 300 may include an integrated battery or power supply, which may be chargeable, rechargeable, and/or replaceable. In some configurations, a central power source may be provided on the elevator system, and wiring may be provided to supply power to each of the wheels. Such power supply may also be used to power the fan assemblies of the elevator systems of the present disclosure. Furthermore, the electronics may include input/output components, control systems, circuit boards, logic boards, and the like, as will be appreciated by those of skill in the art. In some embodiments, the wheels may include braking systems that are configured to recharge the power supply/power source. In some such embodiments, this power supply of the wheels may then be used to drive operation of the fan assemblies.

As shown in FIG. 3, the wheel 300 of this non-limiting illustrative embodiment includes a rotationally fixed stator 306 having a plurality of windings 308. A rotor 310 is located about the stator 306 and may be supported by a bearing (not shown). When the windings 308 of the stator 306 are energized, the electromagnetic field generated by the stator 306 causes rotation of the rotor 310 about the wheel axis 302. The rotor 310 is operably connected to a tire 312, for example via a wheel rim 314 or a shaft (not shown). In the embodiment of FIG. 3, the rotor 310 is connected to the wheel rim 314 via one or more mechanical fasteners, such as bolts, such that rotation of the rotor 310 about the wheel axis 302 drives rotation of the wheel rim 314 about the wheel axis 302. In other embodiments, the wheel rim 314 may be configured as the rotor 310. In this illustrative embodiment, the tire 312 may include a contact surface 316 for contacting and engaging with a surface of a building (e.g., exterior wall, elevator shaft wall, interior wall, etc.). The contact surface 316 may have a smooth or texture surface and may be selected to achieve a desired frictional engagement with the building surface upon which the wheel 300 will travel. The tire 312 is configured to rotate with the wheel rim 314. Furthermore, as will be appreciated by those of skill in the art, the wheels 300 may include additional structure and features, not directly shown, such as a brake assembly and/or a damping device to enhance operation of the wheel 300 and/or the prime mover 304.

Figure 4:
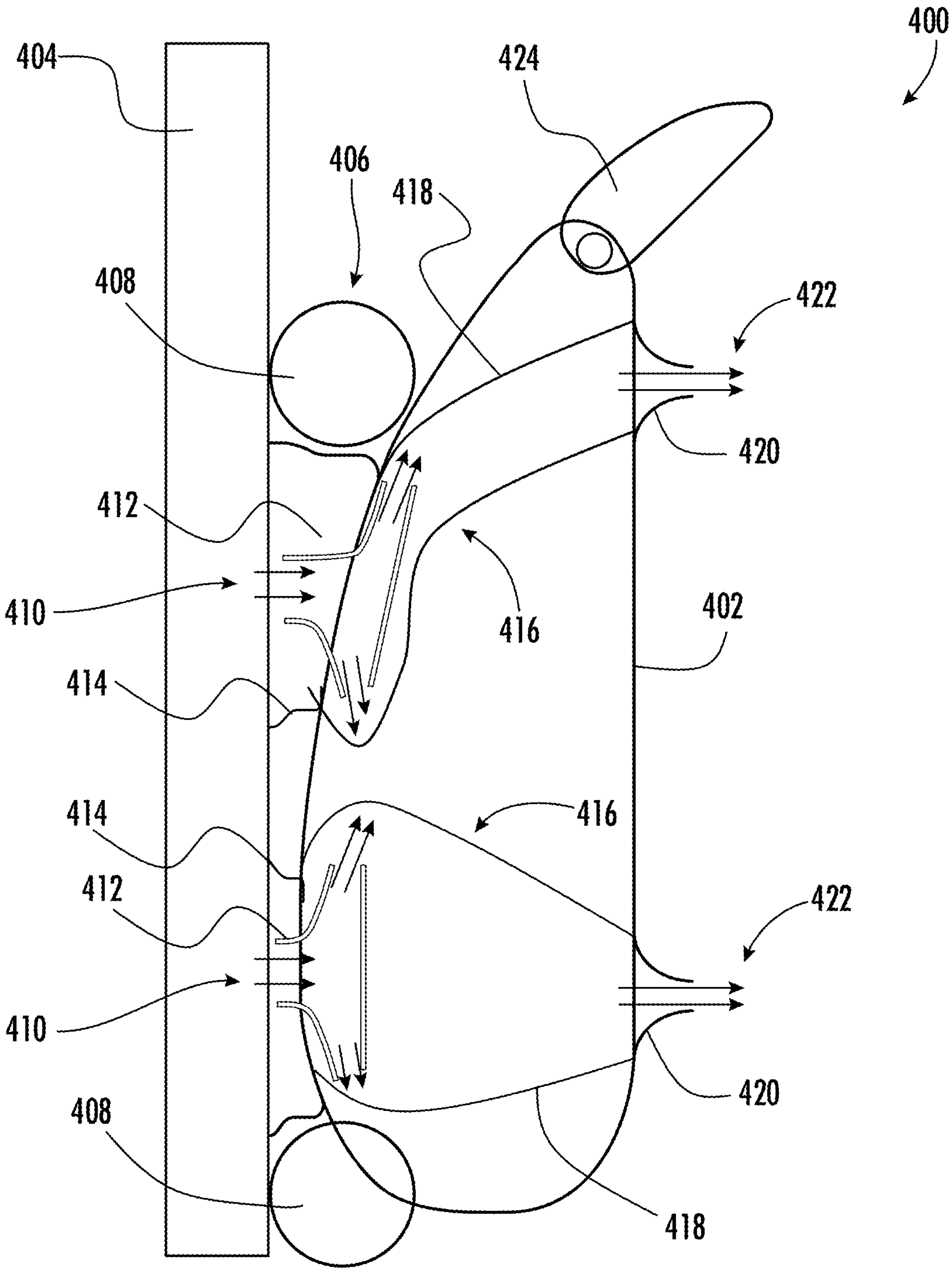
FIG. 4 is a schematic illustration of another configuration of a wall climbing elevator system in accordance with an embodiment of the present disclosure.

Referring now to FIG. 4, a schematic illustration of a wall climbing elevator system 400 in accordance with an embodiment of the present disclosure is shown. The wall climbing elevator system 400 includes a load compartment 402 that is configured to travel along a wall 404 via a carriage assembly 406. The carriage assembly 406 of this illustrative non-limiting embodiment, is integrated with the load compartment 402. Stated another way, the carriage assembly 406 is part of the frame and structure of the load compartment 402. The carriage assembly 406, in accordance with embodiments of the present disclosure, is configured to utilize aerodynamic adhesion for retaining the wall climbing elevator system 400 to the wall 404. The carriage assembly 406 includes wheels 408 that are configured to generate friction forces that support the load compartment 402 and enables travel of the wall climbing elevator system 400 along the wall 404.

Each of the wheels 408 may be a propelled wheel, having an internal motor or the like, as shown and described above. The carriage assembly 406 includes mechanisms for generating aerodynamic adhesion between the carriage assembly 406 and the wall 404. In this illustrative configuration, the aerodynamic adhesion is generated by means of one or more suction systems 410. In the side illustrative depiction of FIG. 4, there are two suction systems 410 shown. However, it will be appreciated that any number of suction systems may be employed, depending on the specific configurations thereof (e.g., size, location, supported weight, etc.). Each suction system 410 includes a fan assembly 412 that is arranged within or otherwise fluidly coupled to a respective suction chamber of the respective suction systems 410. Each suction chamber is defined by a surface of the wall 404 and a respective skirt assembly 414 which may include seals at the contact point or area between the skirt assembly 414 and the wall 404, such as shown and described above.

The suction systems 410 and operation of the wheels 408 may be controlled by a controller, as noted above. The controller may be part of the elevator system 400, such as a part of or carried on the load compartment 402. As noted above, in some embodiments, the controller may be part of an elevator controller that is integrated into the load compartment or otherwise integrated into control of the elevator system 400. The fan assemblies 412 are configured to generate aerodynamic adhesion to attach the wall climbing elevator system 400 to the wall 404. Accordingly, the suction systems 410 may be operated to generate a continuous air flow while maintaining a minimum suction pressure. Travel along the wall 404 may be achieved by driving the wheels 408, such as by using internal electric motors or the like, as shown and described above.

The elevator system 400, in this embodiment, is a more aerodynamic form factor than the configuration shown in, for example, FIG. 1. The load compartment 402 may be shaped to be aerodynamic to provide ease of travel and to reduce air resistance during travel. Also shown in this configuration is a mechanism for generating thrust, which may be used to aid in the engagement and contact between the wall climbing elevator system 400 and the wall 404. For example, as shown, each suction system 410 may have a respective venting system 416. The venting systems 416 include ducting 418 that fluidly connects the fan assemblies 410 to respective nozzles 420 which are configured to generate thrust by means of expelling air from the fan assemblies 410. The nozzles 420 may be fixed nozzles that are arranged to expel exhausted air 422 and cause a thrust that is normal to the surface of the wall 404 along which the wall climbing elevator system 400 is traveling. In some embodiments, the nozzles 420 may be adjustable or directional nozzles that can be used to adjust a direction of exhaust and thus control a thrust vector of the exhausted air 422. The elevator system 400, as shown, includes an optional airfoil 424 arranged at one (or both) ends of the load compartment. Such airfoils 424 may be configured to activate if a speed of travel of the wall climbing elevator system 400 increases beyond a threshold speed. In such situation, the airfoil will deploy to create drag and slow the travel speed. The airfoils 424 may also or alternatively be used to increase a force of contact or lift of the elevator system 400, depending on the arrangement of the airfoil 424 and the specific operational parameters thereof.

Figure 5:
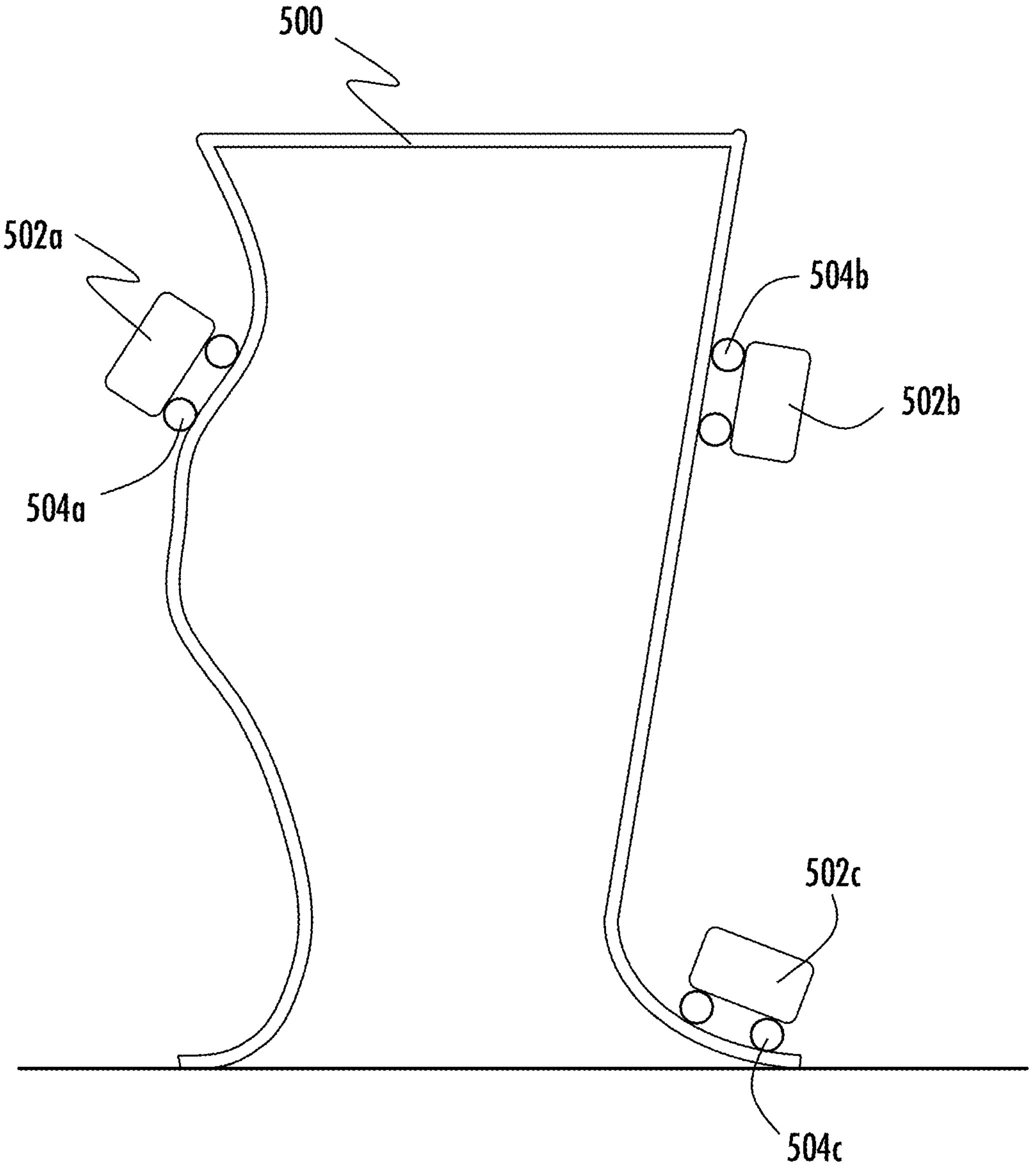
FIG. 5 is a schematic illustration of a building with multiple wall climbing elevator systems in accordance with an embodiment of the present disclosure.

Referring now to FIG. 5, a schematic illustration of a building 500 having multiple wall climbing elevator systems 502*a*, 502*b*, 502*c* operating on an external wall surface is shown. Each of the wall climbing elevator systems 502*a*, 502*b*, 502*c* may be configured similar to that shown and described above. That is, each of the wall climbing elevator systems 502*a*, 502*b*, 502*c* includes a respective load compartment 504*a-c*, respective wheels 506*a-c*, and respective suction systems (not shown) for securing the respective load compartment 504*a-c* to the wall surfaces of the building 500. FIG. 5 illustrates that the wall climbing elevator systems 502*a-c* are capable of traveling along surfaces of the building 500 that are substantially vertical or even inverted. However, the suction systems of the wall climbing elevator systems 502*a-c* are configured to generate a great enough aerodynamic adhesion to ensure continuous contact and retention of the wall climbing elevator systems 502*a-c* to the wall of the building 500.

Figure 6:
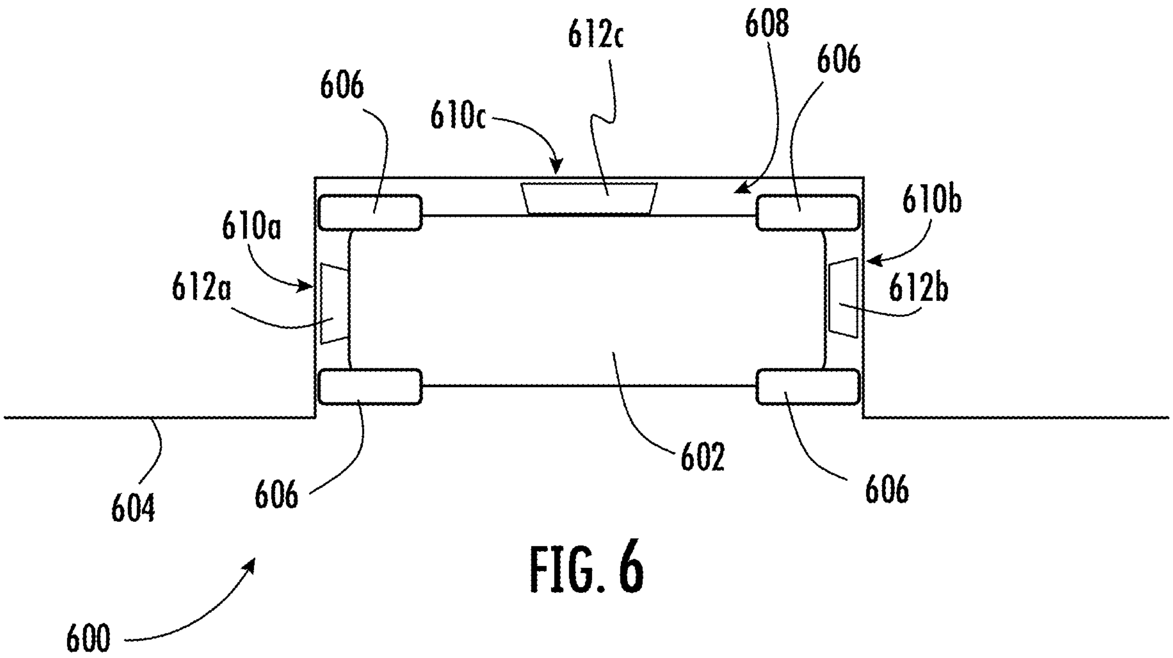
FIG. 6 is a schematic illustration of another configuration of a wall climbing elevator system in accordance with an embodiment of the present disclosure.

Referring now to FIG. 6, a schematic illustration of a wall climbing elevator system 600 in accordance with an embodiment of the present disclosure is shown. The wall climbing elevator system 600 includes a load compartment 602 that is movable along a wall 604 of a building, which may be an interior wall (e.g., elevator shaft, utility shaft, etc.) or an exterior wall. In this configuration, the load compartment 602 is shown with four wheels 606 arranged in pairs on opposite sides of the load compartment 602. The wall 604 includes a channel, recess, or track 608 that defines three wall surfaces 610*a*, 610*b*, 610*c*. The track 608 of this configuration is sized and shaped to receive the entire load compartment 602 and associated wheels 606. The wheels 606 may be configured to engage with and travel along one or more of the wall surfaces 610*a*-610*c*. For example, as shown, the wheels 606 are configured to engage with each of opposing wall surfaces 610*a*, 610*b* of the track 608. The wheels 606 may be configured similar to that shown and described above, providing traction and engagement with the respective wall surfaces 610*a*, 610*b*. The load compartment 602 may be provided with one or more suction systems 612*a-c* to aerodynamically adhere to the track 608. The suction systems 612*a-c* may be configured to engage with the wall surfaces 610*a-c*, respectively. The suction systems 612*a-c* may be configured similar to the suction systems shown and described above.

In some configurations, one or more of the suction systems 612*a-c* may be replaced with a venting thrust configuration, similar to that shown and described with respect to FIG. 4. For example, in some configurations, a single suction system 612*a* may be provided for aerodynamically adhering to the wall surface 610*a*, with thrust nozzles or vents directed toward the opposing wall 610*b* and/or directed away from the third wall surface 610*c*, such that a thrust force is directed toward the third wall surface 610*c*. In still further embodiments, the suction systems 612*a*, 612*b* may be provided to aerodynamically adhere to the opposing walls surfaces 610*a*, 610*b*, and both suction systems 612*a*, 612*b* may vent in a direction away from the third wall surface 610*c* to thereby provide thrust in a direction toward the third wall surface 610*c* and maintain the load compartment 602 within the track 608. It will be appreciated that, in some embodiments, the load compartment 602 may be provided with the wheels 606 directly attached thereto, forming a unitary carriage assembly, such as shown in FIG. 4. In other embodiments, the load compartment 602 may be mounted on a carriage and/or sled, such as shown in FIG. 1.

In the embodiment of FIG. 6, the entire wall climbing elevator system 600 is contained within the track 608. In other embodiments, such as those shown and described with respect to FIGS. 1 and 4, the wall climbing elevator systems may be configured to travel along a single wall surface. In still further embodiments, one or more wheel tracks may be provided on a wall surface to define a path of travel of the wall climbing elevator system.

Figure 7:
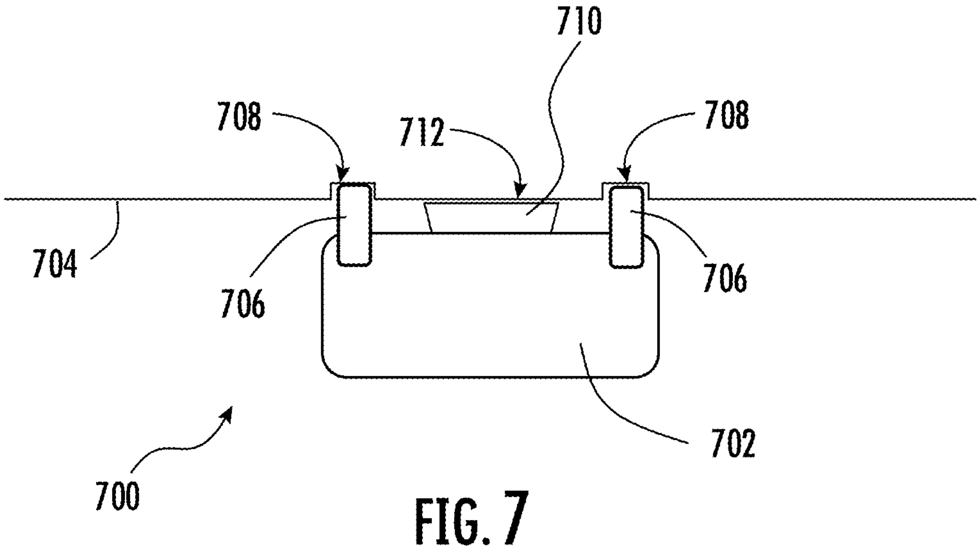
FIG. 7 is a schematic illustration of another configuration of a wall climbing elevator system in accordance with an embodiment of the present disclosure.

For example, referring now to FIG. 7, a schematic illustration of a wall climbing elevator system 700 in accordance with an embodiment of the present disclosure is shown. The wall climbing elevator system 700 includes a load compartment 702 that is movable along a wall 704 of a building, which may be an interior wall (e.g., elevator shaft, utility shaft, etc.) or an exterior wall. In this configuration, the load compartment 702 is shown with two wheels 706, which may be a first pair of wheels, with a second pair of wheels being arranged in line with the illustrated pair. The wall 704 includes two channels, recesses, or wheel tracks 708. The wheel tracks 708 of this configuration, are sized and shaped to receive the wheels 706. The wheels 706 may be configured to engage with and travel along the respective wheel tracks 708 defined in the wall 704. The wheels 706 may be configured similar to that shown and described above, providing traction and engagement with the wheel tracks 708. The load compartment 702 may be provided with one or more suction systems 710 to aerodynamically adhere to a wall surface 712 that is defined between the wheel tracks 708. The suction system 710 may be configured similar to the suction systems shown and described above.

In accordance with embodiments of the present disclosure, wall climbing elevator systems are provided. The wall climbing elevator systems are configured to aerodynamically adhere to a surface of a building, such as a wall surface. The wall surfaces may be internal walls and/or external walls. In some embodiments, the wall surfaces that the wall climbing elevator systems are configured to travel along may be featureless (e.g., smooth surface), may include wheel tracks, and/or may include a track for receiving the wall climbing elevator system. The suction systems of the wall climbing elevator systems provides aerodynamic suction to cause retention of the wall climbing elevator systems to the wall surface. The wheels may be configured to generate friction or traction for propelling the wall climbing elevator system along the wall surface.

As described above, the suction systems are configured to generate aerodynamic adhesion to secure the wall climbing elevator systems to the wall surfaces. The suction systems may include blowers, fans, pumps, vacuum pumps, or the like, which are fluidly coupled to a suction chamber that is confined within a skirt assembly. The skirt assembly is configured to sealingly engage with a wall surface, to thereby allow for pressure differentials to generate suction and retain the wall climbing elevator systems against the wall. In a stopped or stationary state, the suction systems may be turned off, and the low pressure within the suction chamber will passively retain the wall climbing elevator system to the wall. During operation, the suctions systems are activated to pull air from ambient across the seal of the skirt assembly thereby generating continuous pressure differential and suction but also allowing for travel of the wall climbing elevator system along the wall. For example, with the suction systems operational, a film of air will be pulled between the seal of the skirt assembly and the wall surface, raising the skirt assembly away from direct contact with the wall surface. The wheels of the wall climbing elevator system may then be operated to drive the wall climbing elevator system along the wall without damaging the skirt assembly but also while ensuring the suction pressure is maintained to secure the wall climbing elevator system to the wall.

The skirt assemblies of the suction systems of the present disclosure provide sealing and enable generation of sufficient aerodynamic adhesion or suction force to secure the wall climbing elevator system to a wall surface. A dynamic skirt seal may be provided with a predetermined amount of leakage to maintain a predetermined vacuum pressure. The use of vacuum pumps, fans, or the like may be arranged to generate a low pressure (or vacuum pressure) within a pressure chamber of the suction systems. These vacuum pumps or other similar mechanism may be provided in sets with sufficient suction to provide redundancy and managing the normal force needs on the wheels. In accordance with some embodiments of the present disclosure, an active dynamic seal can auto-regulate based on a pressure differential between the outside ambient air and inside the suction chamber. If the pressure drops within the suction chamber, below the predetermined suction pressure, the exterior (ambient) pressure will increase relative to the low pressure within the suction chamber and thus push the seal to close or sealingly engage with the wall surface to build vacuum and vice versa. In accordance with some embodiments of the present disclosure, there may be a managed gap or leak through the skirt assembly and seal elements thereof to maintain a predetermined low or vacuum pressure. The gap will be adjusted with sufficient factor of safety to ensure no loss of traction even under the condition of moving over a small bump, imperfection, or other non-smooth feature of a wall surface.

The wall climbing elevator systems of the present disclosure may be configured with onboard power sources, such as batteries, rechargeable cells, power supplies, or the like. In some embodiments, power may be provided from an electrical bus or power rail along a path of travel, such as arranged within or along a track, or adjacent to such a track. In other embodiments, wireless power, such as capacitive charging or the like may be employed without departing from the scope of the present disclosure. In still further embodiments, the wall climbing elevator systems may be plugged into a power system of a building and arranged with an automatic or quick-release mechanism that is detached when the wall climbing elevator system is used. In still further embodiments, the use of battery packs or battery arrays or similar power storage devices may be used with a power management system. In some such embodiments, the wireless or onboard electrical power (e.g., battery) can enable autonomous operation and mobility, by removing physical connection to the building, and the only connection is by means of the aerodynamic adhesion. The power sources may be used to supply onboard power for operation of the fan assemblies, wheels, and for onboard features, such as cooling and/or air conditioning, car lighting, door operation, displays, and the like.

In accordance with some embodiments, the power is supplied to the hub wheel motors through a storage device like super capacitor or battery that is housed onboard the wall climbing elevator system. In some embodiments, in combination or alternatively to onboard power sources, electrical power may be provided by means of a power rail. Control systems, such as part of the controller 124 or similar control system, may include sensors that are configured to control the tracking and guidance of the wall climbing elevator system along a wall surface. In some embodiments, guidance rails or tracks may be provided for braking and safety function as well as for ride comfort.

In some configurations, the wheels may be configured to rotate in place to allow for changes in direction or different directions of travel along a wall surface. That is, in some configurations, the wheels may be able to be rotated or may be spherical assemblies to allow for more than single-direction motion. In some embodiments, whether using the illustrated wheel configurations or a wheel configuration that permits multi-directional movement, the wall climbing elevator systems of the present disclosure may be autonomously operated, with preset paths of travel. Such autonomous systems may be used for emergency evacuations or the like. Autonomous versions of the wall climbing elevator systems described herein may be controlled with the controller (e.g., controller 124) of the system. The controller may be operably connected to various sensors (e.g., optical image sensors, LIDAR sensors, proximity sensors, etc.) to enable autonomous travel along the wall surfaces of a building. In still further embodiments, wheels may be provided on multiple sides of the load compartment allowing for travel along different wall surfaces. In some such embodiments, the wall climbing elevator systems of the present disclosure may be capable of transitioning or transferring from one building to another building.

The wall climbing elevator systems of the present disclosure may be used to replace or supplement existing elevator systems. In some embodiments, the wall climbing elevator systems are configured to operate within an elevator shaft. In such configurations, various conventional components of elevator systems may be eliminated or minimized. For example, the wall climbing elevator systems in accordance with embodiments of the present disclosure, do not require an elevator machine and/or roping, cables, or suspension means. Additionally, the installation of conventional elevator guide rails may be unnecessary.

In some embodiments, additional optional features may be incorporated into the wall climbing elevator systems. For example, the wall climbing elevator systems may be configured as passenger elevators. In such configurations, the load compartments may be configured similar to conventional or typical elevator cars, with elevator car doors, control panels, and the like. Because the wall climbing elevator systems of the present disclosure are capable of traveling along surfaces having inclines or may be substantially suspended, the wall climbing elevator systems may not always be oriented in the same direction (see., e.g., FIG. 5). In such configurations, passenger compartments may include self-adjusting chairs or seats within the wall climbing elevator system. The self-adjusting seats may be configured with gyroscopes, dampers, springs, or the like, to provide for improved passenger experience during travel in the wall climbing elevator systems of the present disclosure.

The wall climbing elevator systems of the present disclosure may be configured as emergency transport systems. For example, a number of wall climbing elevator systems may be provided along the outside of a building, and in the event of an emergency (e.g., evacuation), people can load into the wall climbing elevator systems and then travel safely to the ground, without clogging stairwells or the like. Furthermore, in some uses, emergency personnel, such as firemen, can travel from the ground (or other location) to a desired location along the outside of a building, without having to climb stairs or the like within the building. The wall climbing elevator systems may be provided with additional safety features, such as parachutes, airbags, backup suction systems (e.g., venturi-based suction).

As used herein, the use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity).

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description but is only limited by the scope of the appended claims.

What is claimed is:

1. A wall climbing elevator system comprising:

a load compartment; and a carriage assembly, wherein the carriage assembly comprises:

a set of wheels configured to frictionally engage with a wall surface of a building; and at least one suction system configured to aerodynamically adhere the carriage assembly and the load compartment to the wall surface, wherein each suction system of the at least one suction system comprises:

a skirt assembly defining a suction chamber between the carriage assembly and the wall surface, wherein the skirt assembly comprises a rigid frame, a biasing element and a seal element comprising an encapsulated O-ring with a coating applied to an exterior of the O-ring; and a fan assembly for generating a low pressure within the suction chamber to generate an aerodynamic adhesion to secure the carriage assembly and the load compartment to the wall surface.

2. The wall climbing elevator system of claim 1, wherein the seal element is configured to sealingly engage with the wall surface.

3. The wall climbing elevator system of claim 2, wherein the seal element is normally biased into sealing engagement with the wall surface.

4. The wall climbing elevator system of claim 3, wherein the seal element is configured to lift from sealing engagement with the wall surface during operation of the fan assembly, to cause a flow of air from ambient and into the suction chamber to maintain a minimum aerodynamic suction pressure.

5. The wall climbing elevator system of claim 1, wherein the set of wheels are each self-powered wheels, comprising a respective prime mover for driving rotation of the respective wheel.

6. The wall climbing elevator system of claim 1, wherein the carriage assembly comprises a sled and the load compartment is mounted to the sled.

7. The wall climbing elevator system of claim 6, further comprising one or more elevator mounts configured to securely attach the load compartment to the sled.

8. The wall climbing elevator system of claim 7, wherein the one or more elevator mounts each comprise at least one of biasing elements and damping elements.

9. The wall climbing elevator system of claim 1, wherein the fan assembly comprises at least two vacuum pumps fluidly coupled to the suction chamber.

10. The wall climbing elevator system of claim 1, wherein the skirt assembly comprises a flow guide extending inward from the skirt assembly and into the suction chamber, the flow guide configured to control flow of ambient air exiting the suction chamber.

11. The wall climbing elevator system of claim 1, wherein the biasing element is configured to bias the seal element into engagement with the wall surface.

12. The wall climbing elevator system of claim 1, wherein the skirt assembly further comprises a flow guide extending inward from the rigid frame and into the suction chamber, the flow guide configured to control flow of ambient air exiting the suction chamber.

13. The wall climbing elevator system of claim 1, wherein the carriage assembly is an integral part of the load compartment.

14. The wall climbing elevator system of claim 1, wherein the load compartment is a passenger compartment of an elevator car.

15. The wall climbing elevator system of claim 1, further comprising an airfoil mounted to the load compartment and configured to generate drag during motion of the load compartment along the wall surface.

16. The wall climbing elevator system of claim 1, further comprising a venting system fluidly coupled to the suction system and to direct exhaust air from the suction chamber to ambient.

17. The wall climbing elevator system of claim 16, further comprising a nozzle at an end of the venting system, the nozzle arranged to generate a thrust force that acts to urge the load compartment toward the wall surface.

18. The wall climbing elevator system of claim 16, wherein:

the at least one suction system comprises a housing that supports the skirt assembly defines the suction chamber, the venting system comprises a plurality of vents arranged about the housing; and the fan assembly comprises a plurality of fans arranged on the housing between the suction chamber and a respective vent of the plurality of vents.

19. The wall climbing elevator system of claim 1, wherein the wheels are configured to travel along tracks formed on the wall surface.

20. The wall climbing elevator system of claim 1, further comprising a controller configured to control operation of the set of wheels and the at least one suction system.

* * * * *